US010424416B2

(12) United States Patent
McMillan

(10) Patent No.: US 10,424,416 B2
(45) Date of Patent: Sep. 24, 2019

(54) LOW TEMPERATURE THERMAL ENERGY CONVERTER FOR USE WITH SPENT NUCLEAR FUEL RODS

(71) Applicant: George Erik McMillan, Hickory, NC (US)

(72) Inventor: George Erik McMillan, Hickory, NC (US)

( * ) Notice: Subject to any disclaimer, the term of this patent is extended or adjusted under 35 U.S.C. 154(b) by 22 days.

(21) Appl. No.: 15/796,093

(22) Filed: Oct. 27, 2017

(65) Prior Publication Data

US 2018/0301232 A1 Oct. 18, 2018

Related U.S. Application Data

(60) Provisional application No. 62/414,507, filed on Oct. 28, 2016.

(51) Int. Cl.
| | |
|---|---|
| *G21D 1/02* | (2006.01) |
| *G21C 19/07* | (2006.01) |
| *F01K 9/00* | (2006.01) |
| *F01K 13/00* | (2006.01) |
| *F01K 25/10* | (2006.01) |
| *G21D 5/04* | (2006.01) |
| *G21F 5/10* | (2006.01) |
| *G21C 19/32* | (2006.01) |

(52) U.S. Cl.
CPC ............... *G21D 1/02* (2013.01); *F01K 9/003* (2013.01); *F01K 13/006* (2013.01); *F01K 25/10* (2013.01); *G21C 19/07* (2013.01); *G21C 19/32* (2013.01); *G21D 5/04* (2013.01); *G21F 5/10* (2013.01); *Y02E 30/40* (2013.01)

(58) Field of Classification Search
CPC . G21D 1/02; G21D 5/04; G21C 19/07; G21C 19/32; G21F 5/10; F01K 9/003; F01K 13/006; F01K 25/10
USPC .................................................. 60/651, 671
See application file for complete search history.

(56) References Cited

U.S. PATENT DOCUMENTS

| | | | | |
|---|---|---|---|---|
| 4,995,234 | A | * | 2/1991 | Kooy ...................... F01K 25/10 60/648 |
| 8,915,083 | B2 | | 12/2014 | McMillan |
| 2007/0007771 | A1 | * | 1/2007 | Biddle ................. B01D 53/002 290/7 |

(Continued)

*Primary Examiner* — Hoang M Nguyen
(74) *Attorney, Agent, or Firm* — Murphy, Bilak & Homiller, PLLC

(57) ABSTRACT

According to an aspect, a vapor powered apparatus for generating electric power includes a liquid chamber that contains a working fluid and a first heat exchanger that transfers heat from fluid coming from a heat source to working fluid coming from the liquid chamber, where the transferred heat vaporizes at least a portion of the working fluid to provide a working pressure of the vaporized working fluid. The apparatus includes a pressure motor to convert the working pressure of the vaporized working fluid into mechanical motion for a power generator. The apparatus includes a vapor chamber to capture the vaporized working fluid and a second heat exchanger to use working fluid from the liquid chamber to condense the captured vaporized working fluid. An exchanger fluid system provides the working fluid to the second heat exchanger from a bottom portion of a pool of working liquid in the liquid chamber.

12 Claims, 5 Drawing Sheets

(56) References Cited

U.S. PATENT DOCUMENTS

| | | | |
|---|---|---|---|
| 2008/0216479 A1* | 9/2008 | Romanelli | F01K 25/10 60/650 |
| 2010/0115948 A1* | 5/2010 | Guerin | F01K 3/186 60/671 |
| 2012/0067047 A1* | 3/2012 | Peterson | C02F 1/22 60/651 |

* cited by examiner

LOW TEMPERATURE THERMAL ENERGY CONVERTER FOR USE WITH SPENT NUCLEAR FUEL RODS

CROSS-REFERENCE TO RELATED APPLICATIONS

This application claims priority to and benefit of U.S. Provisional Application No. 62/414,507, filed Oct. 28, 2016, the contents of which are incorporated herein by reference in their entirety.

TECHNICAL FIELD

The present invention relates generally to the field of thermal energy. More specifically, the present invention relates to a Low Temperature Thermal Energy Converter (LTTEC) for use with spent nuclear fuel rods.

SUMMARY

Of the various issues with storing spent nuclear fuel rods, cost is a major issue. Instead of spending tens of billions to store and deplete a valuable energy resource for 10-20 years, it is recognized herein that this waste could be sent to secondary nuclear facilities, where a specifically designed LTTEC could be used to produce electric power and even revenue from this nuclear waste. Some LTTECs are described in U.S. Pat. No. 8,915,083, issued to this inventor on Dec. 23, 2014 and titled "Vapor Powered Engine/Electric Generator." The contents of U.S. Pat. No. 8,915,083 are incorporated herein in their entirety.

The present solution would involve technological improvements to an LTTEC. One such modification of an LLTEC would include the addition of a thermally conductive coiled tube or other similar device, where the LTTEC is designed such that working fluid fills the coil/device from the lowest point of a working liquid chamber of the LTTEC. In so doing, a thermal reaction takes place, which draws and condenses the water from the surrounding air onto the outer surfaces of the coil.

It is also recognized herein that due to the chemical characteristics of the LTTEC working liquid, when the working fluid is taken from the lowest point of the working liquid chamber and routed through a radiator/exchanger separating a vapor chamber from the working liquid chamber, this creates a condenser that can be used to eliminate the separate cold thermal supply that all other Rankine Cycle systems must have for a successful phase change operation. By removing the separate cold thermal supply from the LLTEC, it allows for a multitude of benefits, including a smaller mass/footprint and the removal of a point of possible failure from the system. Furthermore, the secondary nuclear facilities would be safer than a nuclear reactor-based primary nuclear power plant due to the fact that certain radioactive materials have been spent and there is no reactor.

According to some embodiments, a vapor powered apparatus for generating electric power includes a liquid chamber configured to contain a working fluid, a first heat exchanger, in fluid communication with the liquid chamber, configured to transfer heat from fluid coming from a heat source to working fluid coming from the liquid chamber, where the transferred heat vaporizes at least a portion of the working fluid to provide a working pressure of the vaporized working fluid. The apparatus includes a pressure motor, in fluid communication with the heat exchanger, configured to convert the working pressure of the vaporized working fluid into mechanical motion for a power generator operatively connected to the pressure motor. The apparatus includes a vapor chamber configured to capture the vaporized working fluid exiting the pressure motor and a second heat exchanger configured to use working fluid from a bottom portion of a pool of working liquid in the liquid chamber to condense the captured vaporized working fluid, returning the condensed working fluid back to the liquid chamber. The apparatus also includes an exchanger fluid system within the liquid chamber configured to provide the working fluid from the bottom portion of the pool of working liquid in the liquid chamber to the second heat exchanger. The working fluid becomes colder when maintained at a determined depth in the pool of working fluid in the liquid chamber.

The first heat exchanger may be configured to be in fluid communication with a liquid pool that is configured to obtain heat transferred from spent nuclear fuel rods.

According to some embodiments, a vapor powered apparatus for generating electric power includes a liquid chamber configured to contain a working fluid, a first heat exchanger, in fluid communication with the liquid chamber, configured to transfer heat from fluid coming from a heat source to working fluid coming from the liquid chamber, where the transferred heat vaporizes at least a portion of the working fluid to provide a working pressure of the vaporized working fluid. The apparatus includes a pressure motor, in fluid communication with the heat exchanger, configured to convert the working pressure of the vaporized working fluid into mechanical motion for a power generator operatively connected to the pressure motor. The apparatus includes a vapor chamber configured to capture the vaporized working fluid exiting the pressure motor and a second heat exchanger configured to use working fluid from a bottom portion of a pool of working liquid in the liquid chamber to condense the captured vaporized working fluid, returning the condensed working fluid back to the liquid chamber. The apparatus includes an exchanger fluid system configured to provide the working fluid from the bottom portion of the pool of working liquid in the liquid chamber to the second heat exchanger. The exchanger fluid system includes a conduit entry point at the bottom portion of the pool of working fluid in the liquid chamber and an outside conduit that provides fluid communication between the conduit entry point and the second heat exchanger, where the outside conduit is outside of the liquid and vapor chambers.

The outside conduit may be exposed to air outside of the vapor powered apparatus. The outside conduit may include a coil or increased surface area portion. The coil or increased surface area portion may be lower than the conduit entry point. The working fluid and the coil or increased surface area portion may be arranged to cause condensation of air onto the coil or increased surface area portion.

Of course, the present invention is not limited to the above features and advantages. Those of ordinary skill in the art will recognize additional features and advantages upon reading the following detailed description, and upon viewing the accompanying drawings.

DETAILED DESCRIPTION

All illustrations of the drawings are for the purpose of describing selected embodiments of the present invention and are not intended to limit the scope of the present invention.

There is a mounting problem of growing nuclear waste in the nuclear industry—radioactive waste in the form of spent nuclear fuel rods. Storage is now becoming a growing concern. The industry is actively seeking a solution regarding how to store this nuclear waste. At this point of the spent fuel rods' "half-life," the spent fuel rods are no longer active enough to produce the thermal energy required by a nuclear electric power plant. However, the spent fuel rods are still active enough to pose threats to human health and the environment. The spent fuel rods, in their state, are no longer beneficial for producing electricity effectively in existing nuclear facilities, even though the spent fuel rods are still emitting energy in vast amounts. The technology to effectively harness this low thermal energy has not yet been developed.

Embodiments of the present invention provide what is needed to help manage the ever-growing nuclear waste issue. As storing spent nuclear fuel rods is a very expensive problem, it would be advantageous to harness the majority of the remaining energy so as to pay for the waste issue rectification. Harnessing this energy could also lessen, in some part, the amount of energy required of active fuel rods, alleviating further spent fuel rod storage requirements. In other words, rather than paying to store nuclear waste year after year, this same nuclear waste could be generating energy and possibly revenue.

Steam Ranking Cycle (SRC)

Figure 1:
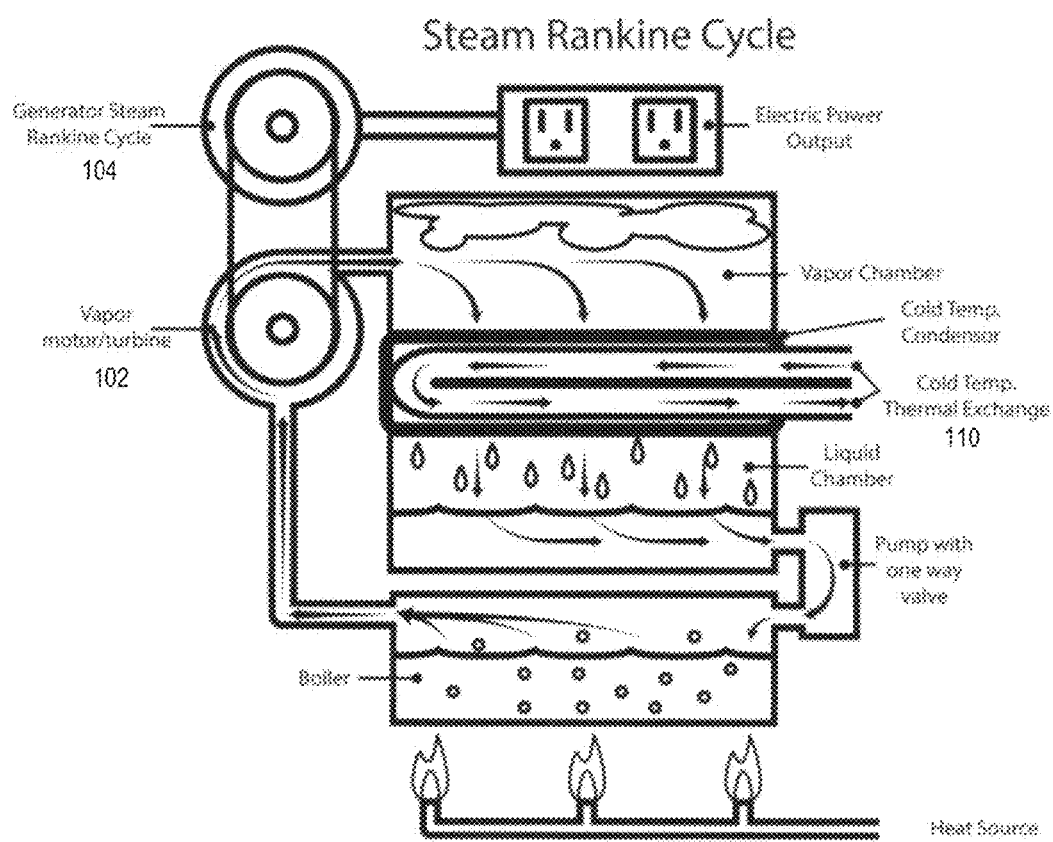
FIG. 1 is an illustration of the Steam Rankine Cycle.

FIG. 1 illustrates an existing Steam Rankine Cycle (SRC) power system, where very high temperatures and energy are required to create working pressure. By creating high temperature vaporized water (steam) and routing this pressure through a vapor motor/turbine 102, mechanical power is developed to turn an electric generator 104. A cold temperature exchanger 110 is used to condense the vaporized water. The draw-backs to the SRC include the incredible amount of thermal energy that is required to achieve the heat needed to effectively create the pressure required for the process. This is the method used in existing nuclear power plants presently. For the above reasons, SRC is not the solution to be utilized with spent nuclear fuel rods.

Organic Ranking Cycle (ORC)

Figure 2:
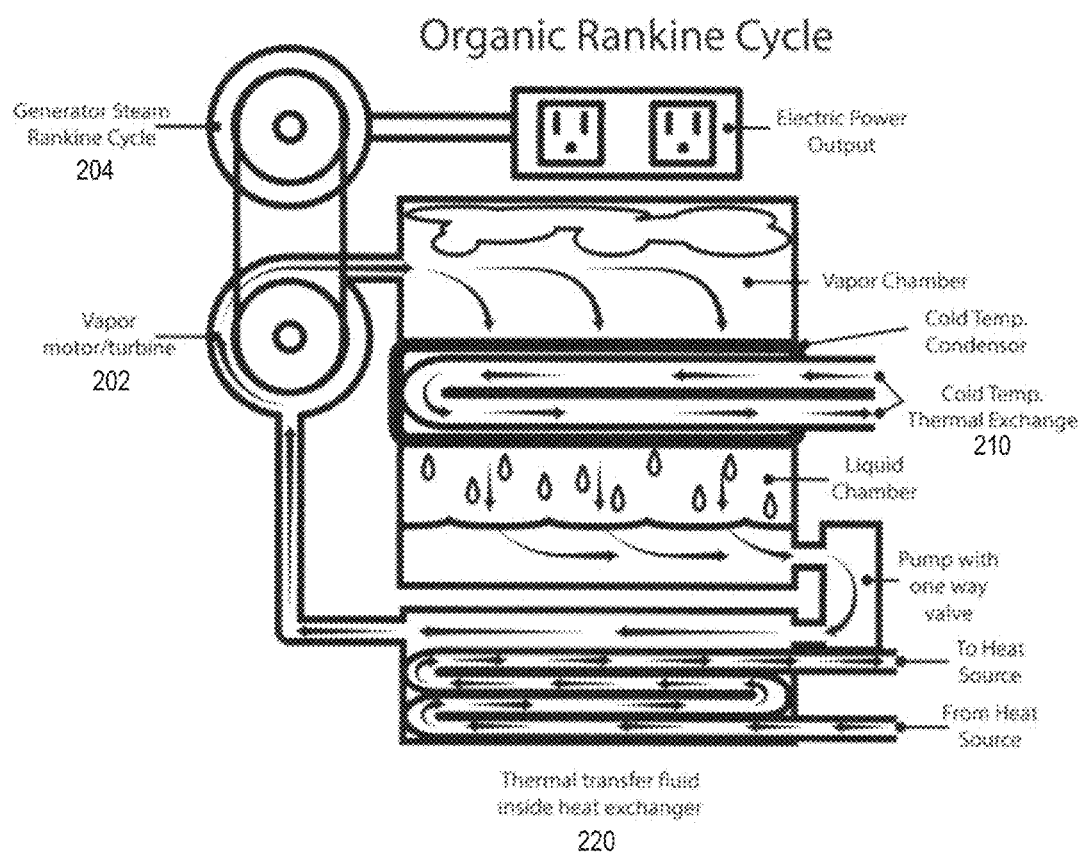
FIG. 2 is an illustration of the Organic Rankine Cycle.

There have been attempts to use lower thermal energy or lower temperatures to vaporize chemicals such as Freon. Toluene, Ammonia, etc. to create power with some success. This involves a method known as the Organic Rankine Cycle (ORC). FIG. 2 illustrates an ORC, with a vapor pressure motor 202, generator 204, heat exchanger 220 and cold temperature exchanger 210. The disadvantage of the ORC is that it uses chemicals that are not only hazardous, these chemicals break down over time and lose the original capability of the given chemical. This system is also not the answer for the spent nuclear fuel rod problem due to the ORC limitations and the type of chemicals used.

LTTEC

Because an LTTEC is able to utilize thermal energy at temperature as low as 98° F. this technology is more appropriate in alleviating the spent fuel rod storage issue.

Figure 3:
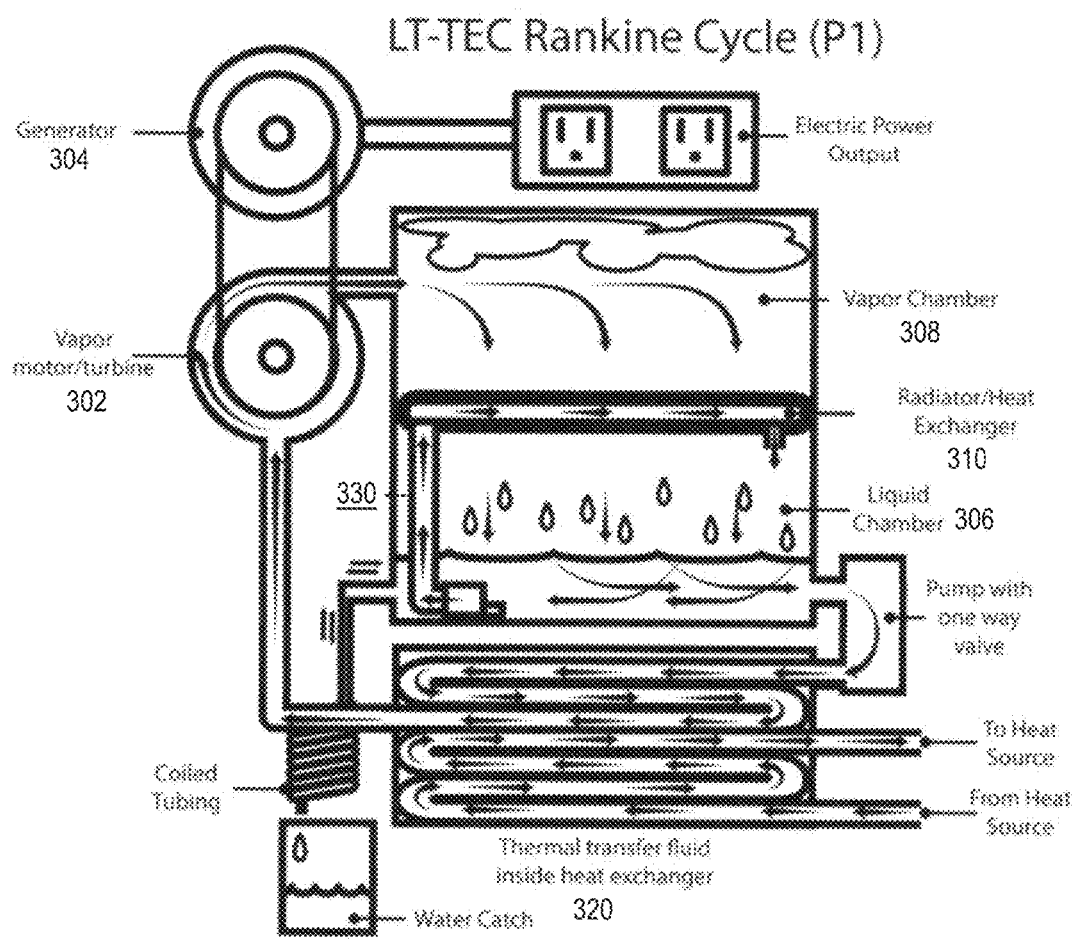
FIG. 3 is an illustration of the LT-TEC Rankine Cycle (P1), according to some embodiments.
Figure 4:
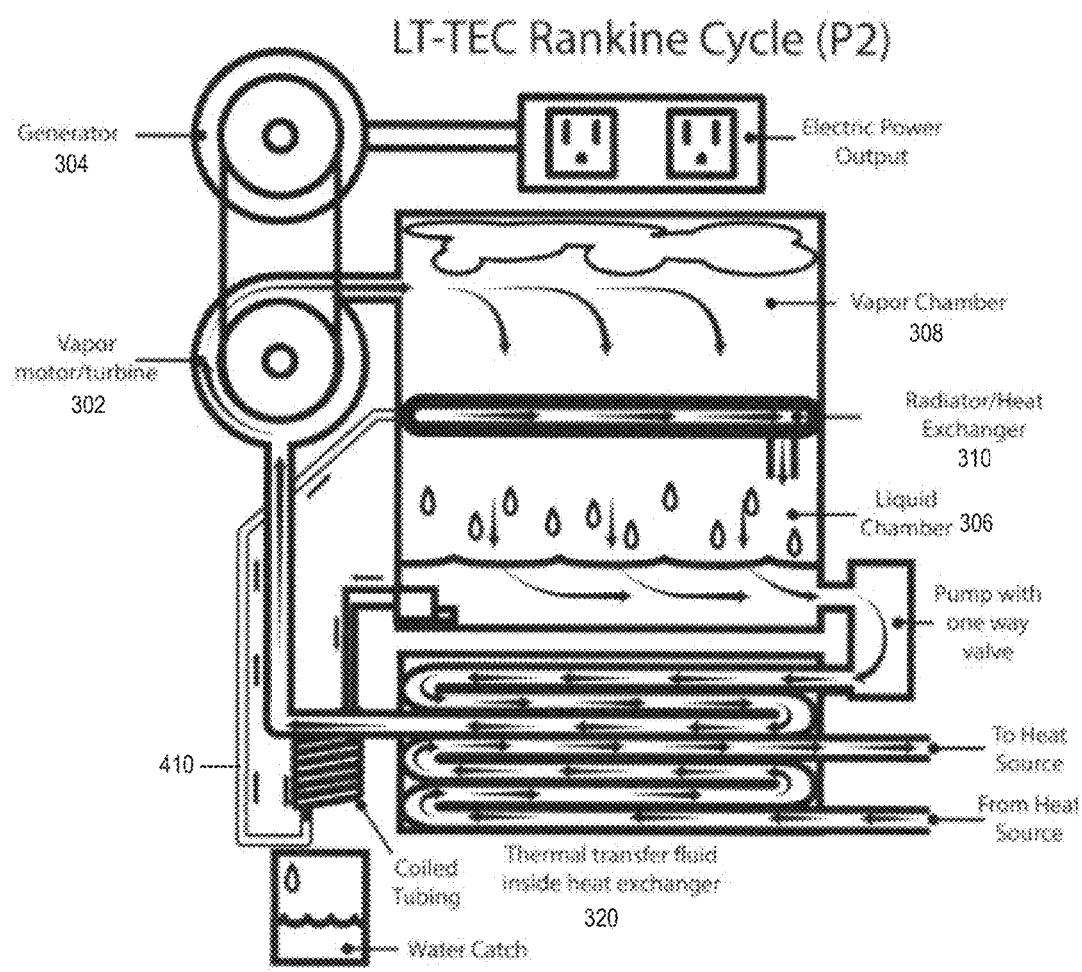
FIG. 4 is an illustration of the LT-TEC Rankine Cycle (P2), according to other embodiments.

FIGS. 3 and 4 illustrate embodiments of an LTTEC with technical improvements. Such systems utilize much lower thermal energy than an SRC. One difference between the LTTEC and the ORC is the fact that the LTTEC uses environmentally friendly chemicals that are not hazardous, caustic, flammable, explosive, corrosive, or even harmful to the ozone layer. As well, most hydrofluorocarbons (HFCs) and hydrofluoroethers (HFEs) commonly used in the LTTEC have little to no deterioration regarding the phase changing cycles over very long timelines.

It is suggested that the spent fuel rods or nuclear waste be placed into a secured facility created with a pool that is re-enforced and redundantly secured and sealed against leakage. This pool would be fitted with a thermostatically controlled valve system that manages and stabilizes the pool at the appropriate temperature required to power the LTTEC electric generator, and as a safety precaution.

As shown in FIG. 3, the LTTEC would include a working liquid chamber 306 that holds working liquid. The pool of working liquid in the liquid chamber 306 may be of a certain depth. The LTTEC includes a heat exchanger 320 for transferring heat from liquid from the heat source to the working liquid that is pumped out of the liquid chamber 306. The LTTEC also includes a vapor chamber 308 where heated working liquid vapor is captured after passing through the vapor motor/turbine 302 that is connected to generator 304. The LTTEC includes a radiator/heat exchanger 310 that uses cooled working liquid from the bottom of the pool of working liquid in the liquid chamber 306 to cause the vapor in the vapor chamber 308 to condense and fill the liquid chamber 306.

In an example, hot water from the pool that captures the heat from the spent fuel rods is cycled through the heat exchanger 320, which is routed to and through a portion of the LTTEC system. This heated water (or other thermal transfer fluid) would provide the thermal energy to run the LTTEC for many years as it consumes the heat from the spent fuel rods, using the heat to generate electric power. This system can turn a problematic expensive waste into a valuable energy resource, solving multiple issues. First, the storage of the spent fuel rods is now somewhat rectified by their placement in a secondary nuclear facility. Second, the remaining radioactive energy is converted into usable electric power. Third, these secondary nuclear power plants are inherently safer than the primary reactor-based nuclear power plants, providing for additional location opportunities. Fourth, by having secondary nuclear facilities utilize this radioactive waste and convert emitted heat it into electricity, the primary plants could use less new nuclear fuel rods in the future. Fifth, since the spent rods are rated as less hazardous and are far less radioactive, a much smaller facility footprint can be achieved.

LTTECs, modified as described herein, may have uses other than only land-based power plants. The LTTEC could be adapted for military applications or container ships.

The LTTECs in FIGS. 3 and 4 and their advantages over the SRC and ORC of FIGS. 1 and 2 will be further described. In existing electric power industrial generators, the SRC is the most common system. In SRCs, two thermal masses are required for phase changing a liquid to vapor and back to liquid. This SRC method utilizes a "Hot Temp" thermal supply, usually in the form of nuclear fuel, burning coal or petrol to super-heat water until a pressurized steam vapor is produced. This pressure produces the means for creating mechanical energy to operate the electric generator 104 via the pressure engine or turbine 102, etc., so as to make electricity. The system then requires a "Cold Temp" thermal mass, primarily in the form of cold water supplied by rivers, lakes and even the ocean itself via plumbing, a pump, and a separate cold liquid containment source. This cold water is cycled through a cold exchanger 110. The steam vapor is directed across the cold exchanger 110, which condenses and converts the steam vapor back into liquid form to be phase changed again or to be released as water.

With regard to the ORC shown in FIG. 2, chemicals such as Freon, Toluene, or other compounds are used in place of water or other liquids for creating pressurized vapor for means of gaining mechanical energy to turn a pressure motor/turbine 202, which in turn spins an electric generator 204, alternator or other electricity producing device to create electric power.

The ORC has several advantages and disadvantages. The process is very similar to the SRC in that the ORC also requires two thermal masses, but the ORC demands far less heat. There must be a hot temperature exchanger 220 as well as a cold temperature exchanger 210 (condenser). Both the SRC and ORC use the same method of utilizing heat to vaporize a liquid to produce mechanical power, which is used to spin a generator, alternator or other electricity producing device, so as to create electric energy. Then, both the SRC and ORC use a cold temperature thermal exchange/condenser system which moves cold water or other thermally conductive liquid through the exchanger/condenser via a pump, plumbing and a separate cold liquid containment source. The vapor is forced through the exchanger/condenser where it is converted back to its liquid form to be phase changed again and again.

In one embodiment of the present invention, illustrated by FIG. 3, the LTTEC power system uses an HFC/HFE designer chemical in place of water. The "Hot Temp" thermal supply is needed the same as with other Rankine Cycle systems to provide the vaporizing temperature to create the mechanical energy. However, with the LTTEC Rankine Cycle process, the cold thermal system is eliminated. The LTTEC uses the chemical from the bottom of the liquid chamber 306 of the system and guides it directly through a radiator/exchanger 310. This method allows for a cold thermal exchanger that does not require any separate "Cold Temp" thermal supply, which is required for all other forms of Rankine Cycle systems.

With regard to HFC/HFE chemicals (and similar), the compound, when in liquid form, becomes colder when maintained at a determined depth. Because of this phenomenon, the chemical in the lower or bottom section of the liquid chamber 306 is guided through the cold exchanger 310. As the vaporized chemical passes over the cold exchanger 310, it rapidly cools and re-condenses the vapor back into liquid form. The LTTEC has a pump and plumbing system 330 to bring the working liquid from a bottom portion of the pool of the working liquid in the liquid chamber 306.

Consistent with certain aspects of the figures and as described in U.S. Pat. No. 8,915,083, the content of which is incorporated herein, an existing LLTEC may be a vapor powered apparatus for generating electric power. The LLTEC may include a hermetically sealed casing, a storage tank containing a working fluid having a boiling point of 150° F. or less. There may be a heating source that vaporizes at least a portion of the working fluid to provide a working pressure of the vaporized working fluid, the heating source being in fluid communication with said storage tank. The LLTEC may include a pressure motor that converts the working pressure of the vaporized working fluid into mechanical motion, where the pressure motor is in fluid communication with a heat source. The LLTEC may include a recapture system configured to capture the vaporized working fluid exiting the pressure motor and return the condensed working fluid back to the storage tank. The pressure motor may be operatively connected to a power generator or alternator. Each of the storage tank, heating source, pressure motor, recapture system, and/or power generator or alternator may be mounted within the hermetically sealed casing.

Also, the working fluid may include Methoxy-nonafluorobutane, $CF_3CF_2C(O)CF(CF_3)_2$, or Dodecafluoro-2-methylpentan-3-one. The working fluid may be NOVEC™ 7000 or other engineered working materials (e.g., ethers and ketones with the same low temperature vaporizing characteristics that do not conduct electrical energy). NOVEC™ 649, 7100, and 1230 may also be suitable for use in certain embodiments.

The heat exchanger may be configured to transfer heat from the fluid from the heating source at a temperature from 90° F. to 150° F., 93° F. to 150° F., 100° F. to 140° F., or 90° F. to 100° F.

In another embodiment illustrated by FIG. 4, the cold working liquid in the LTTEC is routed through a radiator or other form of exchanger 310. However, the working liquid is passed through an external coil system 410 prior to being transferred through the radiator/exchanger 310. The vapor from the pressure motor/turbine 302 exhaust is then directed across-fins or across-tubes of the cold exchanger 310 to be fully reconverted back to liquid form. All other processes may be the same as the LTTEC Rankine Cycle shown in FIG. 3.

These two embodiments of the LTTEC Rankine Cycle have several advantages. First, they remove the complexity of the existing separate cold exchanger process of the SRC and ORC. Second, they also eliminate the separate cold temperature containment and simplify the plumbing. Third, they allow the system to be built much smaller, needing less space. Fourth, they eliminate a point of possible failure from the system. Fifth, the possibility of the cold temperature thermal supply failing and mixing chemicals is eliminated as the moving cold thermal transfer liquid is removed.

Another advantage of the LTTEC of FIG. 4 is that it creates a very beneficial by-product. When a copper or other material with thermal conductive ability is incorporated as a coil (or other form with a large surface area), with the working liquid at the very bottom of the lower liquid chamber 306 fed into the coil system 410, the coil freezes the humidity in the surrounding air. Ice rapidly forms on the coil and insulates the coil. This causes the coil inner temperature to rise minimally. This causes the ice to quickly melt into a container accumulating water. Once the ice melts off of the coil, the coil temperature again drops, causing it to refreeze and build up ice. This causes the coil to become insulated and then rapidly melt again due to the slight increase in the coil temperature. The cycle continues and repeats over and over, filling the container with distilled water that can be used for certain maintenance purposes.

Figure 5:
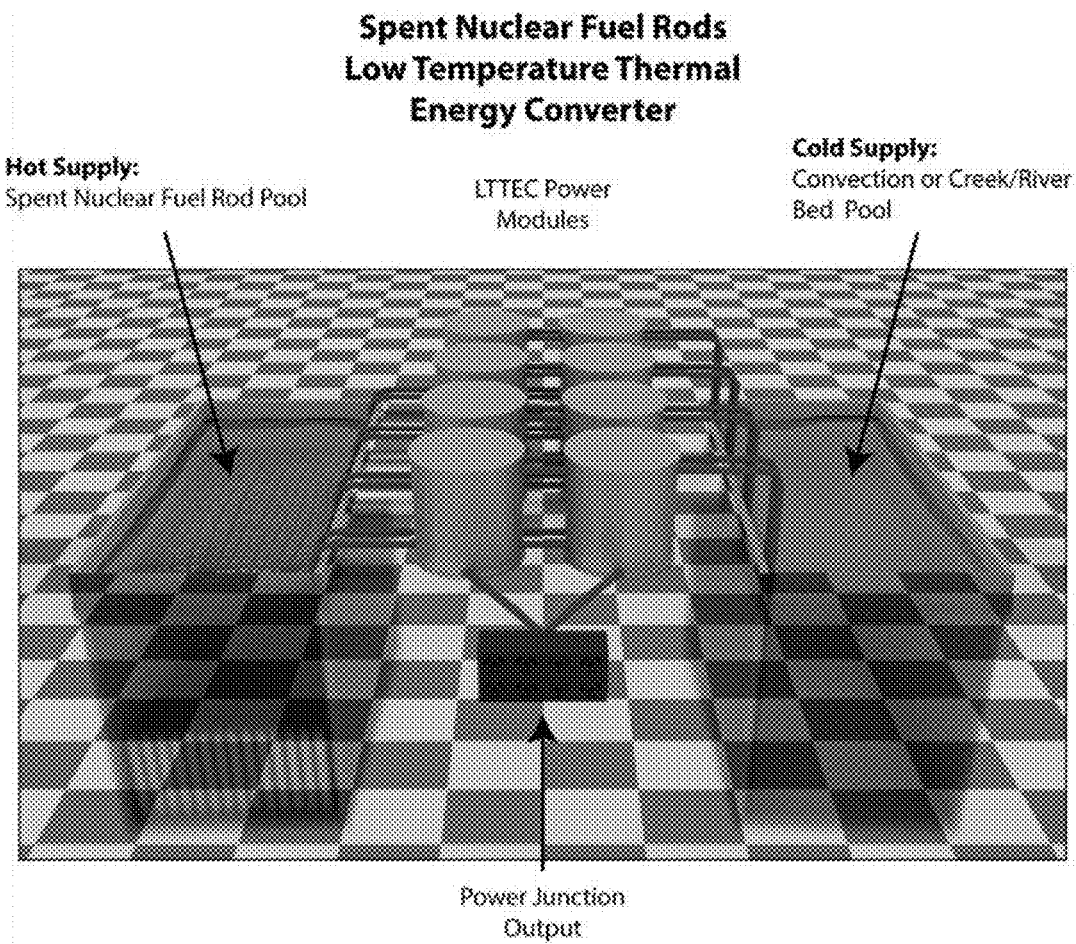
FIG. 5 is a simplified schematic of a spent nuclear fuel rod low temperature thermal energy converter, according to some embodiments.

FIG. 5 illustrates an overview of an example system that may involve LTTEC power modules, with a hot supply (e.g., spent fuel rods). While a cold supply is not necessarily needed in certain embodiments of the LTTEC itself, a cold supply can be on hand in a simpler fashion for safety or other maintenance purposes. Multiple LTTEC power modules may combine together to provide electrical power to a power junction output or other component or location.

While the LTTEC is described with respect to nuclear waste, the LTTEC embodiments may serve other purposes.

In some cases, an LTTEC can be miniaturized and incorporated within a special garment such as a vest or similar clothing to allow the wearer to generate enough electric power so as to charge personal devices such as small radios or cellular phones, etc.

It is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A vapor powered apparatus for generating electric power, comprising:
   a liquid chamber configured to contain a working fluid;
   a first heat exchanger, in fluid communication with the liquid chamber and a spent nuclear fuel rod storage system, configured to transfer heat from fluid coming from spent nuclear fuel rods to working fluid coming from the liquid chamber, wherein the transferred heat vaporizes at least a portion of the working fluid to provide a working pressure of the vaporized working fluid;
   a pressure motor, in fluid communication with the heat exchanger, configured to convert the working pressure of the vaporized working fluid into mechanical motion for a power generator operatively connected to the pressure motor;
   a vapor chamber configured to capture the vaporized working fluid exiting the pressure motor;
   a second heat exchanger configured to use working fluid from the liquid chamber to condense the captured vaporized working fluid, returning the condensed working fluid back to the liquid chamber, wherein at least one of the second heat exchanger and the liquid chamber is configured such that heat is able to transfer from the working fluid to a cooling source outside of the vapor powered apparatus; and
   an exchanger fluid system within the liquid chamber configured to provide the working fluid to the second heat exchanger from a bottom portion of a pool of working liquid in the liquid chamber.

2. The vapor powered apparatus of claim 1, wherein the working liquid has a boiling point of 150 degrees F. or less.

3. The vapor powered apparatus of claim 1, wherein the working fluid comprises Methoxy-nonafluorobutane, $CF_3CF_2C(O)CF(CF_3)_2$, or Dodecafluoro-2-methylpentan-3-one.

4. The vapor powered apparatus of claim 1, further comprising the generator.

5. The vapor powered apparatus of claim 1, wherein the working fluid becomes colder when maintained at a determined depth in the pool of working fluid in the liquid chamber.

6. A vapor powered apparatus for generating electric power, comprising:
   a liquid chamber configured to contain a working fluid;
   a first heat exchanger, in fluid communication with the liquid chamber, configured to transfer heat from fluid coming from a heating source to working fluid coming from the liquid chamber, wherein the transferred heat vaporizes at least a portion of the working fluid to provide a working pressure of the vaporized working fluid;
   a pressure motor, in fluid communication with the heat exchanger, configured to convert the working pressure of the vaporized working fluid into mechanical motion for a power generator operatively connected to the pressure motor;
   a vapor chamber configured to capture the vaporized working fluid exiting the pressure motor;
   a second heat exchanger configured to use working fluid from the liquid chamber to condense the captured vaporized working fluid, returning the condensed working fluid back to the liquid chamber; and
   an exchanger fluid system configured to provide the working fluid to the second heat exchanger from a bottom portion of a pool of working liquid in the liquid chamber, wherein the exchanger fluid system comprises:
   a conduit entry point at the bottom portion of the pool of working fluid in the liquid chamber; and
   an outside conduit that provides fluid communication between the conduit entry point and the second heat exchanger, wherein at least a portion of the outside conduit is outside of the liquid and vapor chambers, and wherein the outside conduit comprises a coil or increased surface area portion that is lower than the conduit entry point.

7. The vapor powered apparatus of claim 6, wherein the working fluid and the coil or increased surface area portion is arranged to cause condensation of air onto the coil or increased surface area portion.

8. The vapor powered apparatus of claim 6, wherein the working liquid has a boiling point of 150 degrees F. or less.

9. The vapor powered apparatus of claim 6, wherein the working fluid comprises Methoxy-nonafluorobutane, $CF_3CF_2C(O)CF(CF_3)_2$, or Dodecafluoro-2-methylpentan-3-one.

10. The vapor powered apparatus of claim 6, wherein the working fluid becomes colder when maintained at a determined depth in the pool of working fluid in the liquid chamber.

11. The vapor powered apparatus of claim 1, further comprising a thermostatically controlled valve system that manages and stabilizes the fluid coming from the spent nuclear fuel rods at the appropriate temperature required to power the power generator.

12. The vapor powered apparatus of claim 6, wherein the first heat exchanger is in fluid communication with a spent nuclear fuel rod storage system.

* * * * *